(12) United States Patent
Mitchell et al.

(10) Patent No.: US 10,386,106 B2
(45) Date of Patent: Aug. 20, 2019

(54) ICE MAKER WITH A RADIAL AND THRUST BEARING

(71) Applicant: General Electric Company, Schenectady, NY (US)

(72) Inventors: Alan Joseph Mitchell, Louisville, KY (US); Bart Andrew Nuss, Fisherville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 69 days.

(21) Appl. No.: 15/045,456

(22) Filed: Feb. 17, 2016

(65) Prior Publication Data

US 2017/0234595 A1    Aug. 17, 2017

(51) Int. Cl.
| | |
|---|---|
| *F25C 5/02* | (2006.01) |
| *F25C 5/04* | (2006.01) |
| *F25C 1/147* | (2018.01) |
| *F16C 21/00* | (2006.01) |
| *F16C 17/02* | (2006.01) |
| *F16C 19/10* | (2006.01) |
| *F16C 19/16* | (2006.01) |

(52) U.S. Cl.
CPC .............. *F25C 1/147* (2013.01); *F16C 21/00* (2013.01); *F25C 5/02* (2013.01); *F16C 17/02* (2013.01); *F16C 19/10* (2013.01); *F16C 19/16* (2013.01); *F25C 5/04* (2013.01); *F25C 5/046* (2013.01)

(58) Field of Classification Search
CPC .. F25C 5/046; F25C 5/04; F25C 5/005; F25C 5/02; F25C 5/18; F25C 5/182; F25C 5/185; F25C 5/007; F25C 2700/10; F25D 23/065; F25D 17/065; F25D 23/028

USPC .......................................................... 62/344
See application file for complete search history.

(56) References Cited

U.S. PATENT DOCUMENTS

| | | | | |
|---|---|---|---|---|
| 2,713,790 A | * | 7/1955 | Barber ................... | G01N 11/14 73/54.28 |
| 2,986,902 A | * | 6/1961 | Michener ............... | F25C 1/145 62/298 |
| 3,196,624 A | * | 7/1965 | Reynolds ................ | F25C 1/147 222/2 |
| 3,214,935 A | | 11/1965 | Conto | |
| 3,536,115 A | * | 10/1970 | Weiler ................... | A23N 17/02 241/82.5 |
| 4,167,895 A | * | 9/1979 | Rubinstein .............. | F04B 1/324 91/506 |
| 4,497,184 A | * | 2/1985 | Utter ....................... | F25C 1/147 100/117 |
| 4,741,173 A | * | 5/1988 | Neumann ................ | F25C 1/147 62/298 |

(Continued)

FOREIGN PATENT DOCUMENTS

EP    2549209 A1 *  1/2013  .............. F25C 1/147

*Primary Examiner* — Filip Zec
*Assistant Examiner* — Daniel C Comings
(74) *Attorney, Agent, or Firm* — Dority & Manning, P.A.

(57) ABSTRACT

An ice maker includes a casing that defines a chamber. The casing extends between a top portion and a bottom portion. An extruder die is mounted to the casing at the top portion of the casing. An auger is disposed within the chamber of the casing. A radial sleeve bearing engages the auger at the extruder die. A radial and thrust bearing engages the auger at the bottom portion of the casing. A related refrigerator appliance is also provided.

18 Claims, 5 Drawing Sheets

(56) References Cited

U.S. PATENT DOCUMENTS

| | | | | |
|---|---|---|---|---|
| 4,947,652 A | * | 8/1990 | Arcangeli | F25C 1/14 |
| | | | | 62/137 |
| 5,109,679 A | * | 5/1992 | Hida | F25C 1/147 |
| | | | | 241/DIG. 17 |
| 5,421,713 A | * | 6/1995 | Backus | A21C 1/06 |
| | | | | 366/77 |
| 5,644,927 A | | 7/1997 | Tatematsu et al. | |
| 6,280,092 B1 | * | 8/2001 | Backus | A21C 1/06 |
| | | | | 384/425 |
| 6,343,416 B1 | * | 2/2002 | Miller | F25C 1/147 |
| | | | | 29/890.035 |
| 2013/0276472 A1 | * | 10/2013 | Mitchell | F25C 1/147 |
| | | | | 62/344 |

* cited by examiner

US 10,386,106 B2

ICE MAKER WITH A RADIAL AND THRUST BEARING

FIELD OF THE INVENTION

The present subject matter relates generally to auger-style ice makers.

BACKGROUND OF THE INVENTION

Certain refrigerator appliances include an ice maker. To produce ice, liquid water is directed to the ice maker and frozen. A variety of ice types can be produced depending upon the particular ice maker used. For example, certain ice makers include a mold body for receiving liquid water. An auger within the mold body can rotate and scrape ice off an inner surface of the mold body to form ice nuggets. Such ice makers are generally referred to as nugget style ice makers. Certain consumers prefer nugget style ice makers and their associated ice nuggets.

Rotating the auger within the mold body poses certain challenges. For example, the auger can apply a large force onto a wall of mold body when the auger rotates and scrapes ice off the inner surface of the mold body. In turn, a bearing can be subjected to significant wear due to the large force applied by the auger, and the wear can generate debris that contaminates ice within the mold body.

Accordingly, an ice maker with features for limiting a force appliance by an auger onto a mold body during rotation of the auger within the mold body would be useful.

BRIEF DESCRIPTION OF THE INVENTION

The present subject matter provides an ice maker. The ice maker includes a casing that defines a chamber. The casing extends between a top portion and a bottom portion. An extruder die is mounted to the casing at the top portion of the casing. An auger is disposed within the chamber of the casing. A radial sleeve bearing engages the auger at the extruder die. A radial and thrust bearing engages the auger at the bottom portion of the casing. A related refrigerator appliance is also provided. Additional aspects and advantages of the invention will be set forth in part in the following description, or may be apparent from the description, or may be learned through practice of the invention.

In a first exemplary embodiment, an ice maker includes a casing that defines a chamber. The casing extends between a top portion and a bottom portion. An extruder die is mounted to the casing at the top portion of the casing. An auger is disposed within the chamber of the casing. A radial sleeve bearing engages the auger at the extruder die. A radial and thrust bearing engages the auger at the bottom portion of the casing.

In a second exemplary embodiment, a refrigerator appliance is provided. The refrigerator appliance includes a housing that defines a chilled chamber. An ice maker is disposed within the housing. The ice maker includes a casing that defines a chamber. The casing extends between a top portion and a bottom portion. An extruder die is mounted to the casing at the top portion of the casing. An auger is disposed within the chamber of the casing. A radial sleeve bearing engages the auger at the extruder die. A radial and thrust bearing engages the auger at the bottom portion of the casing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
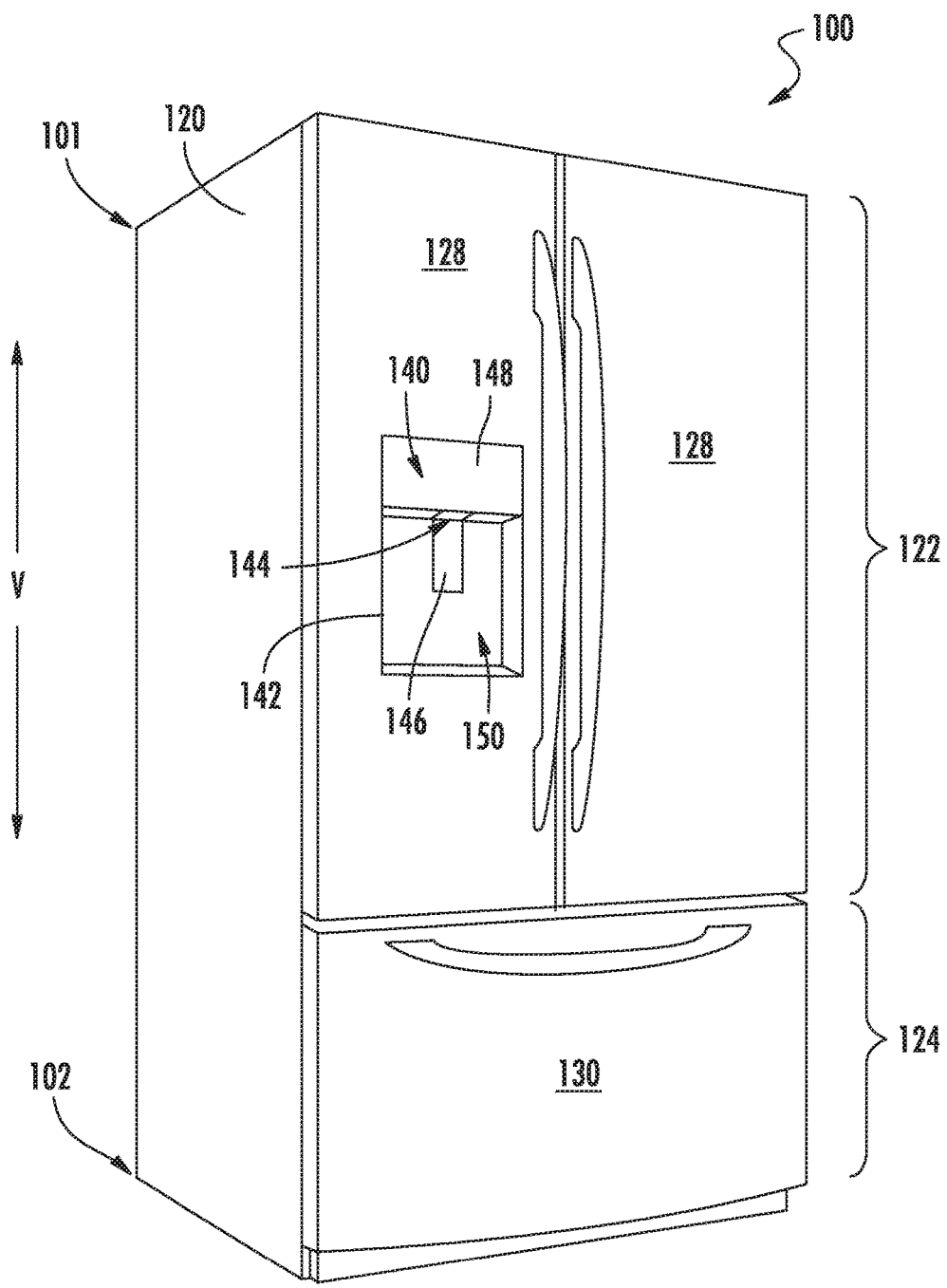
FIG. 1 provides a perspective view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a refrigerator appliance 100 according to an exemplary embodiment of the present subject matter. Refrigerator appliance 100 includes a cabinet or housing 120 that extends between a top 101 and a bottom 102 along a vertical direction V. Housing 120 defines chilled chambers for receipt of food items for storage. In particular, housing 120 defines fresh food chamber 122 positioned at or adjacent top 101 of housing 120 and a freezer chamber 124 arranged at or adjacent bottom 102 of housing 120. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance or a standalone ice-maker appliance. Consequently, the description set forth herein is for illustrative purposes only and is not intended to be limiting in any aspect to any particular refrigerator chamber configuration.

Refrigerator doors 128 are rotatably hinged to an edge of housing 120 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. Refrigerator doors 128 and freezer door 130 are shown in the closed configuration in FIG. 1.

Refrigerator appliance 100 also includes a dispensing assembly 140 for dispensing liquid water and/or ice. Dispensing assembly 140 includes a dispenser 142 positioned on or mounted to an exterior portion of refrigerator appliance 100, e.g., on one of doors 120. Dispenser 142 includes a discharging outlet 144 for accessing ice and liquid water. An actuating mechanism 146, shown as a paddle, is mounted below discharging outlet 144 for operating dispenser 142. In alternative exemplary embodiments, any suitable actuating mechanism may be used to operate dispenser 142. For example, dispenser 142 can include a sensor (such as an ultrasonic sensor) or a button rather than the paddle. A user interface panel 148 is provided for controlling the mode of operation. For example, user interface panel 148 includes a plurality of user inputs (not labeled), such as a water dispensing button and an ice-dispensing button, for selecting a desired mode of operation such as crushed or non-crushed ice.

Discharging outlet 144 and actuating mechanism 146 are an external part of dispenser 142 and are mounted in a dispenser recess 150. Dispenser recess 150 is positioned at a predetermined elevation convenient for a user to access ice or water and enabling the user to access ice without the need to bend-over and without the need to open doors 120. In the exemplary embodiment, dispenser recess 150 is positioned at a level that approximates the chest level of a user.

Figure 2:
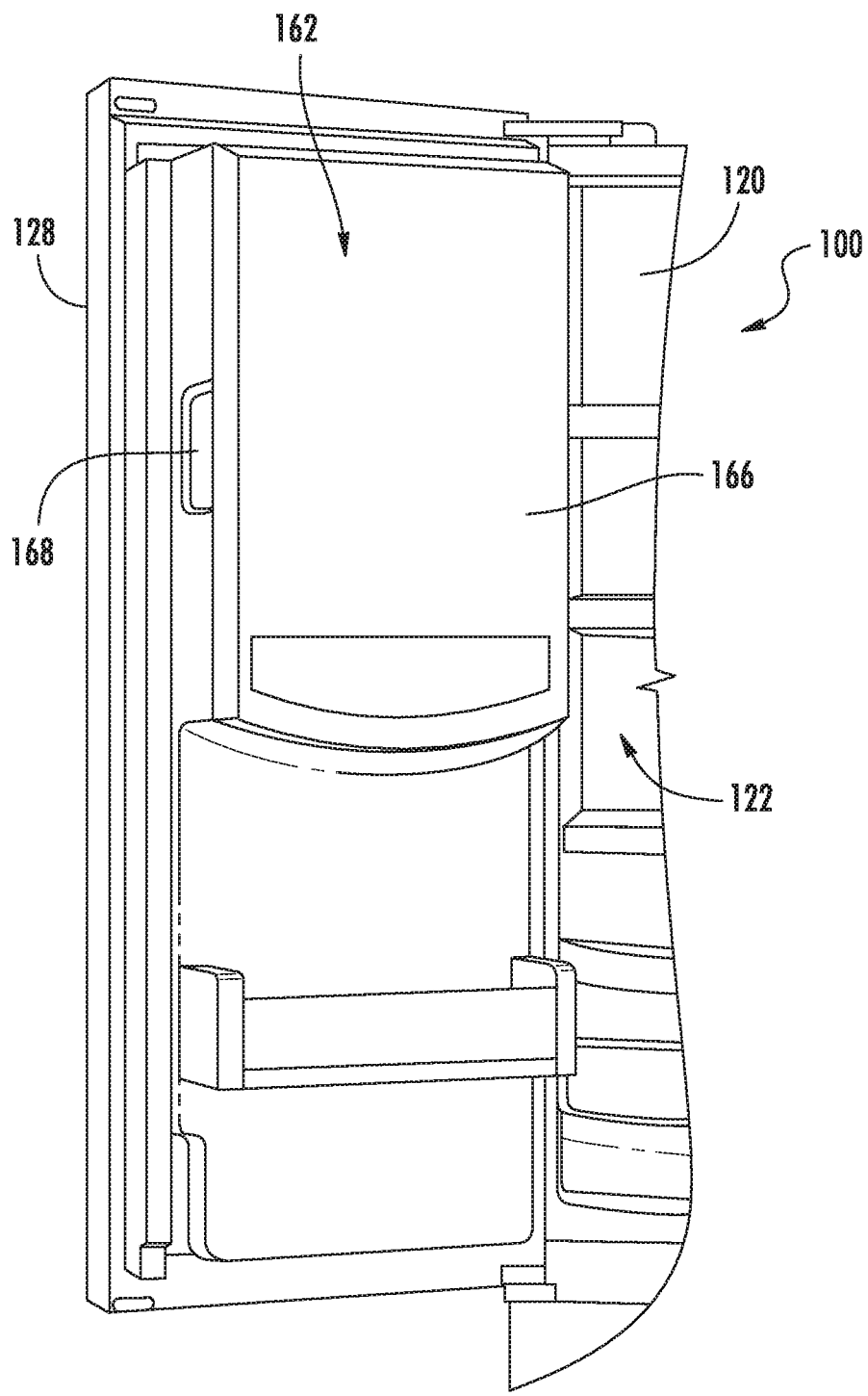
FIG. 2 provides a perspective view of a door of the exemplary refrigerator appliance of FIG. 1.

FIG. 2 provides a perspective view of a door of refrigerator doors 128. Refrigerator appliance 100 includes a sub-compartment 162 defined on refrigerator door 128. Sub-compartment 162 may be referred to as an "icebox." Sub-compartment 162 extends into fresh food chamber 122 when refrigerator door 128 is in the closed position. As discussed in greater detail below, an ice maker or ice making assembly 160 and an ice storage bin 164 (FIG. 3) are positioned or disposed within sub-compartment 162. Thus, ice is supplied to dispenser recess 150 (FIG. 1) from the ice making assembly 160 and/or ice storage bin 164 in sub-compartment 162 on a back side of refrigerator door 128. Chilled air from a sealed system (not shown) of refrigerator appliance 100 may be directed into components within sub-compartment 162, e.g., ice making assembly 160 and/or ice storage bin 164. In certain exemplary embodiments, a temperature air within sub-compartment 162 may correspond to a temperature of air within fresh food chamber 122, such that ice within ice storage bin 164 melts over time.

An access door 166 is hinged to refrigerator door 128. Access door 166 permits selective access to sub-compartment 162. Any manner of suitable latch 168 is configured with sub-compartment 162 to maintain access door 166 in a closed position. As an example, latch 168 may be actuated by a consumer in order to open access door 166 for providing access into sub-compartment 162. Access door 166 can also assist with insulating sub-compartment 162, e.g., by thermally isolating or insulating sub-compartment 162 from fresh food chamber 122.

Figure 3:
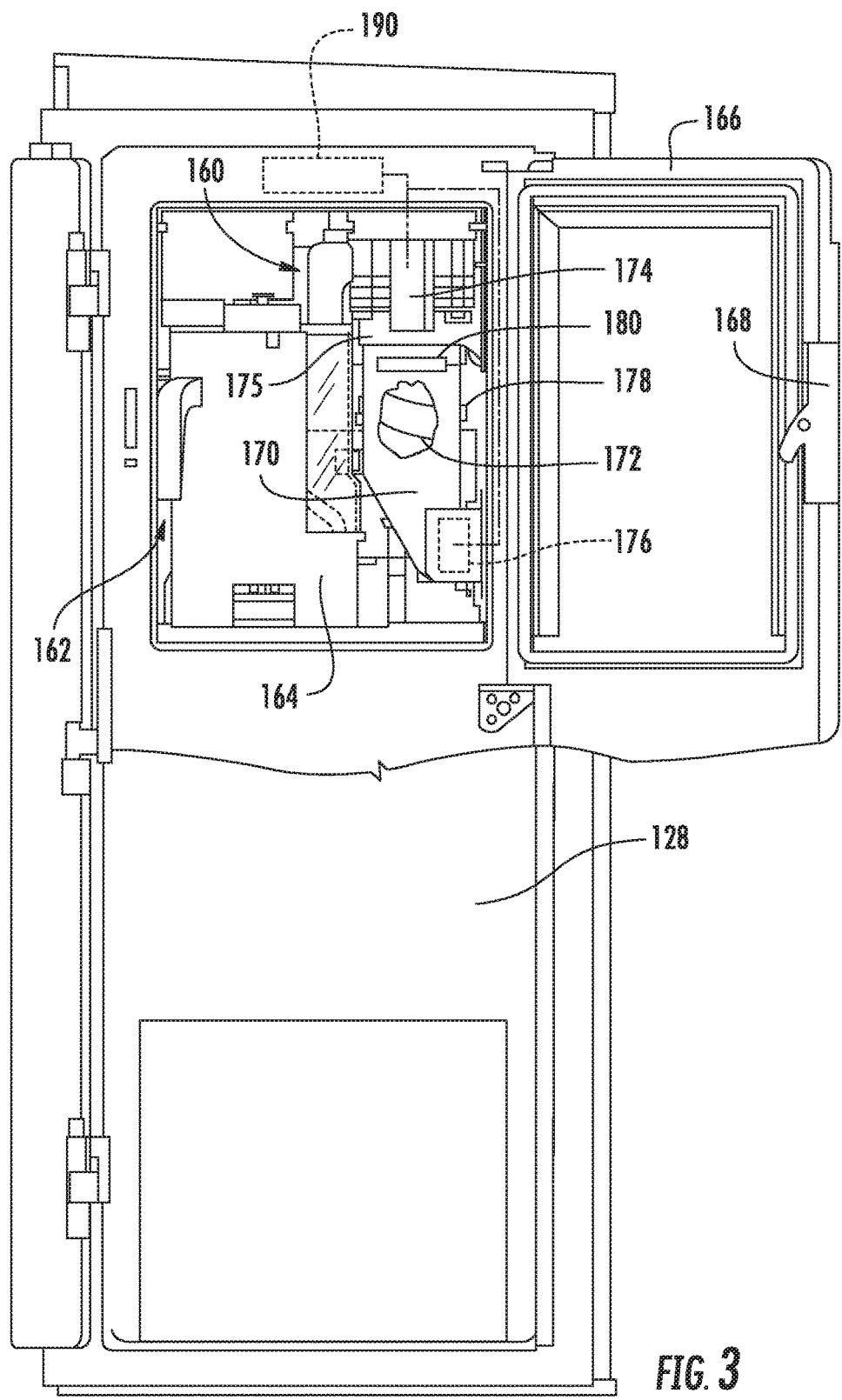
FIG. 3 provides an elevation view of the door of the exemplary refrigerator appliance of FIG. 2 with an access door of the door shown in an open position.

FIG. 3 provides an elevation view of refrigerator door 128 with access door 166 shown in an open position. As may be seen in FIG. 3, ice making assembly 160 is positioned or disposed within sub-compartment 162. Ice making assembly 160 includes a mold body or casing 170. An auger 172 is rotatably mounted in a mold body within casing 170 (shown partially cutout to reveal auger 172). In particular, a motor 174 is mounted to casing 170 and is in mechanical communication with (e.g., coupled to) auger 172. Motor 174 is configured for selectively rotating auger 172 in the mold body within casing 170. During rotation of auger 172 within the mold body, auger 172 scrapes or removes ice off an inner surface of the mold body within casing 170 and directs such ice to an extruder 175. At extruder 175, ice nuggets are formed from ice within casing 170. An ice bucket or ice storage bin 164 is positioned below extruder 175 and receives the ice nuggets from extruder 175. From ice storage bin 164, the ice nuggets can enter dispensing assembly 140 and be accessed by a user as discussed above. In such a manner, ice making assembly 160 can produce or generate ice nuggets.

Ice making assembly 160 also includes a fan 176. Fan 176 is configured for directing a flow of chilled air towards casing 170. As an example, fan 176 can direct chilled air from an evaporator of a sealed system through a duct to casing 170. Thus, casing 170 can be cooled with chilled air from fan 176 such that ice making assembly 160 is air cooled in order to form ice therein. Ice making assembly 160 also includes a heater 180, such as an electric resistance heating element, mounted to casing 170. Heater 180 is configured for selectively heating casing 170, e.g., when ice prevents or hinders rotation of auger 172 within casing 170.

Operation of ice making assembly 160 is controlled by a processing device or controller 190, e.g., that may be operatively coupled to control panel 148 for user manipulation to select features and operations of ice making assembly 160. Controller 190 can operate various components of ice making assembly 160 to execute selected system cycles and features. For example, controller 190 is in operative communication with motor 174, fan 176 and heater 180. Thus, controller 190 can selectively activate and operate motor 174, fan 176 and heater 180.

Controller 190 may include a memory and microprocessor, such as a general or special purpose microprocessor operable to execute programming instructions or microcontrol code associated with operation of ice making assembly 160. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 190 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Motor 174, fan 176 and heater 180 may be in communication with controller 190 via one or more signal lines or shared communication busses.

Ice making assembly 160 also includes a temperature sensor 178. Temperature sensor 178 is configured for measuring a temperature of casing 170 and/or liquids, such as liquid water, within casing 170. Temperature sensor 178 can be any suitable device for measuring the temperature of casing 170 and/or liquids therein. For example, temperature sensor 178 may be a thermistor or a thermocouple. Controller 190 can receive a signal, such as a voltage or a current, from temperature sensor 190 that corresponds to the temperature of the temperature of casing 170 and/or liquids therein. In such a manner, the temperature of casing 170 and/or liquids therein can be monitored and/or recorded with controller 190.

Figure 4:
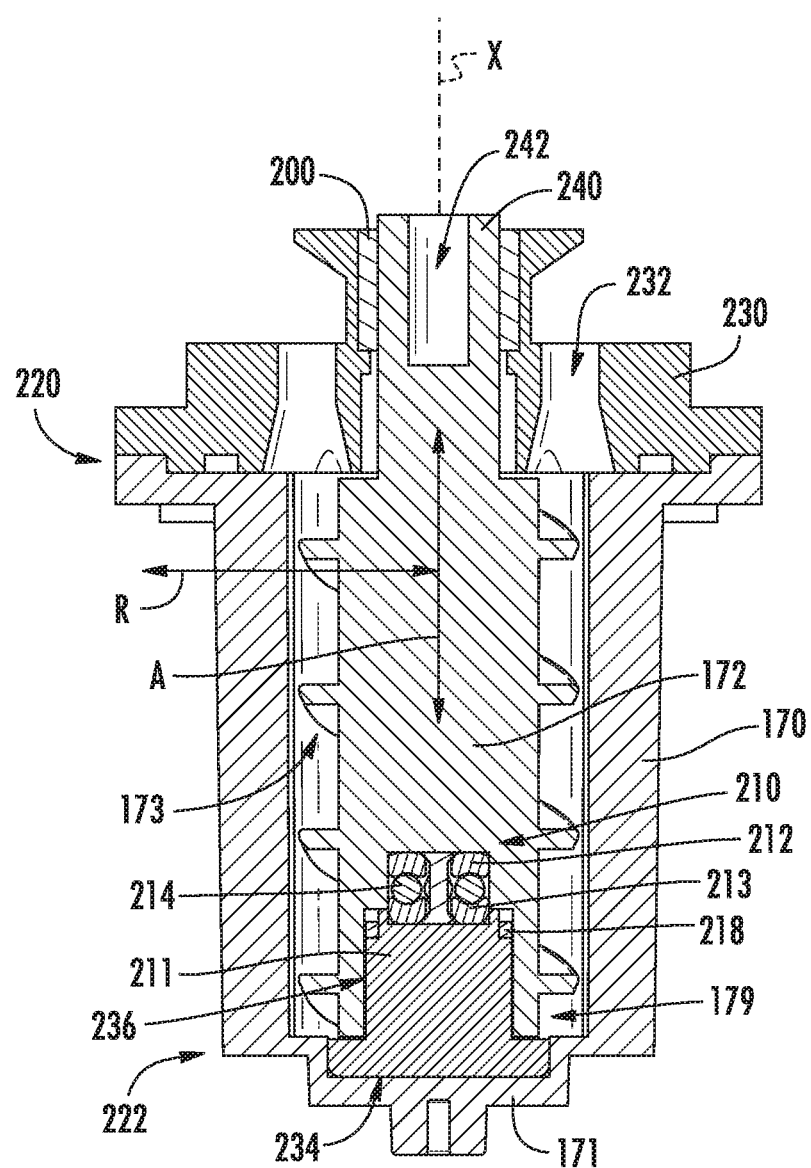
FIG. 4 provides a section view of certain components of an ice making assembly of the exemplary refrigerator appliance of FIG. 2.
Figure 5:
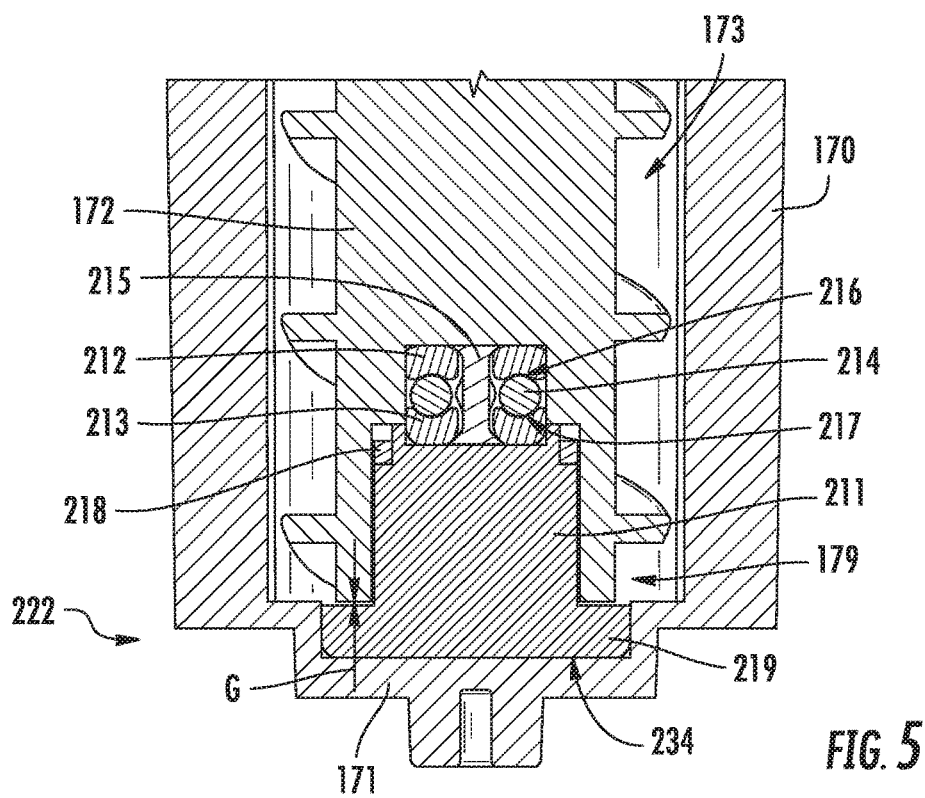
FIG. 5 provides a partial, section view of a radial and thrust bearing of the ice making assembly of FIG. 4.

FIG. 4 provides a section view of certain components of ice making assembly 160. FIG. 5 provides a partial, section view of a radial and thrust bearing 210 of ice making assembly 160. As discussed above, ice making assembly 160 includes casing 170 and auger 172. During rotation of auger 172 within casing 170, auger 172 scrapes or removes ice off an inner surface of casing 170 and directs such ice to extruder 175. Such action of auger 172 can generate a downward force on auger 172 and urges auger 172 towards a bottom wall 171 of casing 170. Ice making assembly 160 includes features for limiting or obstructing linear motion of auger 172 relative to casing 170, e.g., motion of auger 172 towards bottom wall 171 of casing 170. Such features are discussed in greater detail below in the context of FIG. 4.

As may be seen in FIG. 4, ice making assembly 160 includes a radial sleeve bearing 200 and radial and thrust bearing 210. Radial sleeve bearing 200 and radial and thrust bearing 210 assist with regulating motion of auger 172 relative to casing 170, as discussed in greater detail below. Radial sleeve bearing 200 and radial and thrust bearing 210 may be positioned at or adjacent opposite ends of casing 170. For example, casing 170 extends between a top portion 220 and a bottom portion 222, and radial sleeve bearing 200 and radial and thrust bearing 210 are each positioned at a respective one of top and bottom portions 220, 222 of casing 170.

Radial and thrust bearing 210 is positioned at and engages auger 172 at bottom portion 222 of casing 170. Conversely, radial sleeve bearing 200 is positioned proximate, e.g., above, top portion 220 of casing 170. In particular, radial sleeve bearing 200 may be positioned at and engage auger 172 at an extruder die 230 that includes converging extruding openings 232. Extruder die 230 is mounted to casing 170 at or adjacent top portion 220 of casing 170. Extruder die 230 may function as a cover or seal for a chamber 173 defined by casing 170 in which auger 172 is disposed. Thus, radial sleeve bearing 200 may be positioned above radial and thrust bearing 210, as shown in FIG. 4.

Auger 172 is rotatable on an axis of rotation X within chamber 173 of casing 170. Radial sleeve bearing 200 obstructs or limits movement of auger 172 relative to casing 170 along a direction perpendicular to the axis of rotation X, e.g., while allowing relatively free movement of auger 172 along the axis of rotation X. Thus, radial sleeve bearing 200 may limit radial movement of auger 172 at or adjacent top portion 220 of casing 170. Radial sleeve bearing 200 may include an annular plastic, such as polytetrafluoroethylene (PTFE), bearing that extends circumferentially around a shaft 240 of auger 172, which has a socket 242. Radial sleeve bearing 200 may also extend along a radial direction R between auger 172 and extruder die 230, e.g., above chamber 173 of casing 170.

Radial and thrust bearing 210 obstructs or limits movement of auger 172 relative to casing 170 along both the axis of rotation X and the direction perpendicular to the axis of rotation X. Thus, radial and thrust bearing 210 may limit radial and axial movement of auger 172 within chamber 173 of casing 170. As shown in FIGS. 4 and 5, radial and thrust bearing 210 includes a bearing support 211, a top race 212, a bottom race 213 and a plurality of bearings 214, such as carbon steel balls. A lubricant may be disposed on the bearings 214.

Bearing support 211 is disposed within chamber 173 of casing 170. Bearing support 211 may be received within auger 172 at or adjacent a distal end portion 179 of auger 172. In particular, a bottom plate 219 of bearing support 211 may be received within a bearing pocket 234 defined by casing 170 on bottom wall 171 of casing 170 (e.g., and that corresponds to a lowest portion of chamber 173 of casing 170). Bottom plate 219 of bearing support 211 may extend along the radial direction R between opposite side sides of bearing pocket 234 on bottom wall 171 of casing 170. Bottom plate 219 of bearing support 211 may be fixed to casing 170, e.g., bottom wall 171 of casing 170, such that auger 172 rotates on bearing support 211 during operation of ice making assembly 160. Thus, bottom plate 219 of bearing support 211 may assist with centering distal end portion 179 of auger 172 on the axis of rotation X. The axis of rotation X may be vertical or substantially (e.g., within ten degrees of) vertical in certain exemplary embodiments.

Top race 212 is positioned at (e.g., and mounted to) auger 172, and bottom race 213 is positioned at (e.g., and mounted to) bearing support 211. Top race 212 may be fixed relative to auger 172 when top race 212 is mounted to auger 172. Thus, top race 212 may rotate with auger 172 during operation of ice making assembly 160. Conversely, bottom race 213 may be fixed relative to bearing support 211 when bottom race 213 is mounted to bearing support 211. Thus, bottom race 213 may not rotate with auger 172 during operation of ice making assembly 160. Top and bottom 212, 213 may also extend circumferentially around a pin 215 of radial and thrust bearing 210. Pin 215 may also couple top and bottom races 212, 213 together. Top and bottom 212, 213 may also be spaced apart from each other such that top and bottom races 212, 213 do not contact each other.

Bearings 214 are positioned between top and bottom races 212, 213 and extend between top and bottom races 212, 213. Bearings 214 may include spherical bearings or cylindrical bearings. Thus, top and bottom 212, 213 may rotate relative to each other on bearings 214 while also limiting movement of auger 172 relative to casing 170 along both the axis of rotation X and the direction perpendicular to the axis of rotation X. In particular, auger 172 defines an axial direction A and a radial direction R that are perpendicular to each other. Top race 212 has a bearing surface 216, and bottom race 213 also has a bearing surface 217. Bearings 214 extends between bearing surface 216 of top race 212 and bearing surface 217 of bottom race 213 along the axial direction A. Thus, bearing surface 216 of top race 212 and bearing surface 217 of bottom race 213 may be spaced apart and face each other along the axial direction A, and bearings 214 may transfer forces along the axial direction A (and/or in a limited manner along the radial direction R) between top and bottom races 212, 213.

Radial and thrust bearing 210 may be received within a bearing pocket 236 defined by auger 172. As may be seen in FIGS. 4 and 5, bearing pocket 236 of auger 172 may be positioned above bottom wall 171 of casing 170. Thus, portions (e.g., top race 212, bottom race 213, bearings 214, etc.) of radial and thrust bearing 210 may be positioned above bottom wall 171 of casing 170 within chamber 173 of casing 170. Bearing pocket 236 of auger 172 may extend into auger 172 upwardly along the axial direction A from distal end portion 179 in order to form or hold an air pocket within auger 172 within which the portions of radial and thrust bearing 210 are disposed. Thus, the portions of radial and thrust bearing 210 may be protected or sealed from water within chamber 173 of casing 170 by the portions positioning radial and thrust bearing 210 within bearing pocket 236 of auger 172. A ring seal 218 also extends between bearing support 211 and auger 172, e.g., below top and bottom races 212, 213 along the axial direction A. Ring seal 218 may hinder or prevent wear debris and/or bearing grease from flowing from bearing pocket 236 into chamber 173 of casing 170 and thereby contaminating water within chamber 173 of casing 170. Ring seal 218 may be annular and formed with a plastic, such as polytetrafluoroethylene (PTFE), which does not require lubrication.

Radial and thrust bearing 210 may mounted or attached to casing 170 at bottom portion 222 of casing 170 in order to limit or prevent auger 172 from grinding against bottom wall 171 of casing 170. For example, top race 212 may be positioned on auger 172 within bearing pocket 236 of auger 172, and bearings 214 extend along the axial direction A between top and bottom races 212, 213. In turn, bottom race 213 extends downwardly along the axial direction A from bearings 214 to bearing support 211 within bearing pocket 236 of auger 172, and bearing support 211 extends along the axial direction A from bottom race 213 to bottom wall 171 of casing 170. In such a manner, radial and thrust bearing 210 may extend along the axial direction A between auger 172 and casing 170 in order to limit movement of auger 172 relative to casing 170 along the axis of rotation X and the axial direction A.

As shown in FIG. 5, bottom wall 171 of casing 170 is spaced apart from distal end portion 179 of auger 172 along the axial direction A by a gap G. By limiting downward motion of auger 172 along the axial direction A towards bottom wall 171 of casing 170, radial and thrust bearing 210 assists with maintaining the gap G between distal end portion 179 of auger 172 and bottom wall 171 of casing 170. In such a manner, rubbing or wear between auger 172 and casing 170 can be limited or avoided and performance of ice making assembly 160 can be improved.

Figure 6:
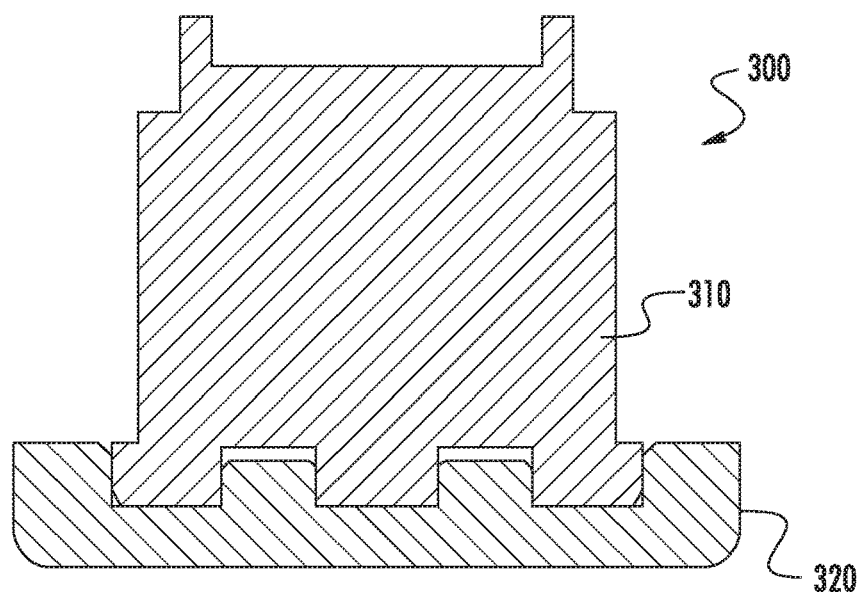
FIG. 6 provides a section view of a bearing support for the radial and thrust bearing of FIG. 5 according to another exemplary embodiment of the present subject matter.

FIG. 6 provides a section view of a bearing support 300 according to another exemplary embodiment of the present subject matter. Bearing support 300 may be used in or with radial and thrust bearing 210 (FIG. 5), e.g., in lieu of bearing support 211. As shown in FIG. 6, bearing support 300 includes a top cylinder 310 and a bottom plate 320. Top cylinder 310 and bottom plate 320 are separate pieces and are mounted to each other, e.g., such that top cylinder 310 and bottom plate 320 do not rotate relative to one another during rotation of auger 172. Top cylinder 310 and bottom plate 320 may be fastened, adhered or otherwise suitable coupled to each other.

Top cylinder 310 and bottom plate 320 may be constructed of or with different materials. For example, bottom plate 320 may be constructed of or with a plastic, and top cylinder 310 may be constructed of or with a metal, such as stainless steel. Thus, bottom plate 320 may have a lower thermal conductivity than top cylinder 310. Auger 172 may be constructed of or with a metal, such as stainless steel, in common with top cylinder 310, and casing 170 may be constructed of or with cast metal, such as aluminum, in certain exemplary embodiments. In such a manner, heat transfer to water between bottom plate 320 and casing 170 may be limited, e.g., in order to limit freezing of water at or adjacent bottom plate 320.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An ice maker, comprising:
   a casing defining a chamber, the casing extending between a top portion of the casing and a bottom portion of the casing;
   an extruder die mounted to the casing at the top portion of the casing;
   an auger disposed within the chamber of the casing;
   a radial sleeve bearing engaging the auger at the extruder die, the radial sleeve bearing being disposed above the casing and within the extruder die; and
   a radial and thrust bearing engaging the auger at the bottom portion of the casing, the radial and thrust bearing being disposed within the auger,
   wherein the auger is rotatable on an axis of rotation within the chamber of the casing, the radial sleeve bearing obstructing movement of the auger relative to the casing along a direction perpendicular to the axis of rotation, the radial and thrust bearing obstructing movement of the auger relative to the casing along both the axis of rotation and the direction perpendicular to the axis of rotation.

2. The ice maker of claim 1, wherein the radial sleeve bearing comprises an annular plastic bearing that extends between the extruder die and the auger proximate the top portion of the casing.

3. The ice maker of claim 1, wherein the radial and thrust bearing comprises:
   a bearing support positioned on the casing and extending upwardly from the bottom portion of the casing;
   a top race positioned at the auger;
   a bottom race positioned at the bearing support; and
   a plurality of bearings extending between the top and bottom races.

4. The ice maker of claim 3, wherein the radial and thrust bearing further comprises a ring seal that extends between the auger and the bearing support.

5. The ice maker of claim 4, wherein a lubricant is disposed on the bearings of the plurality of bearings.

6. The ice maker of claim 3, wherein the auger defines an axial direction and a radial direction that are perpendicular to each other, the top and bottom races each having a bearing surface, the bearings of the plurality of bearings extending between the bearing surface of the top race and the bearing surface of the bottom race along the axial direction.

7. The ice maker of claim 6, wherein a bottom plate of the bearing support is received within a bearing support pocket defined by the casing at the bottom portion of the casing, the bottom plate of the bearing support extending within the bearing support pocket along the radial direction.

8. The ice maker of claim 7, wherein a bottom end of the auger has a bottom face, and the bottom face of the auger is spaced apart from the bottom plate of the bearing support along the axial direction at the bottom portion of the casing so that the bottom face of the auger does not contact the bottom plate of the bearing support.

9. The ice maker of claim 3, wherein the bearing support is fixed to the casing.

10. A refrigerator appliance comprising:
    a housing defining a chilled chamber;
    an ice maker disposed within the housing, the ice maker comprising
       a casing defining a chamber, the casing extending between a top portion of the casing and a bottom portion of the casing;
       an extruder die mounted to the casing at the top portion of the casing;
       an auger disposed within the chamber of the casing;

a radial sleeve bearing engaging the auger at the extruder die, the radial sleeve bearing being disposed above the casing within the extruder die; and a radial and thrust bearing engaging the auger at the bottom portion of the casing, the radial and thrust bearing being disposed within the auger, wherein the auger is rotatable on an axis of rotation within the chamber of the casing, the radial sleeve bearing obstructing movement of the auger relative to the casing along a direction perpendicular to the axis of rotation, the radial and thrust bearing obstructing movement of the auger relative to the casing along both the axis of rotation and the direction perpendicular to the axis of rotation.

11. The refrigerator appliance of claim 10, wherein the radial sleeve bearing comprises an annular plastic bearing that extends between the extruder die and the auger proximate the top portion of the casing.

12. The refrigerator appliance of claim 10, wherein the radial and thrust bearing comprises:

a bearing support positioned on the casing and extending upwardly from the bottom portion of the casing;

a top race positioned at the auger;

a bottom race positioned at the bearing support; and a plurality of bearings extending between the top and bottom races.

13. The refrigerator appliance of claim 12, wherein the radial and thrust bearing further comprises a ring seal that extends between the auger and the hearing support.

14. The refrigerator appliance of claim 13, wherein a lubricant is disposed on the bearings of the plurality of bearings.

15. The refrigerator appliance of claim 12, wherein the auger defines an axial direction and a radial direction that are perpendicular to each other, the top and bottom races each having a bearing surface, the bearings of the plurality of bearings extending between the bearing surface of the top race and the bearing surface of the bottom race along the axial direction.

16. The refrigerator appliance of claim 15, wherein a bottom plate of the bearing support is received within a bearing support pocket defined by the casing at the bottom portion of the casing, the bottom plate of the bearing support extending within the bearing support pocket along the radial direction.

17. The refrigerator appliance of claim 16, wherein a bottom end of the auger has a bottom face, and the bottom face of the auger is spaced apart from the bottom plate of the bearing support along the axial direction at the bottom portion of the casing so that the bottom face of the auger does not contact the bottom plate of the bearing support.

18. The refrigerator appliance of claim 12, wherein the bearing support is fixed to the casing.

* * * * *